(12) United States Patent
Park et al.

(10) Patent No.: US 7,458,225 B2
(45) Date of Patent: Dec. 2, 2008

(54) DUAL-TYPE AIR-TYPE AIR CONDITIONING SYSTEM FOR VEHICLES

(75) Inventors: Tae-Young Park, Daejeon (KR); Yoon-Ho Wang, Daejeon (KR); Jeong-Jae Lee, Daejeon (KR); Joong-Un Park, Daejeon (KR)

(73) Assignee: Halla Climate Control Corp., Daejeon-si (KR)

( * ) Notice: Subject to any disclaimer, the term of this patent is extended or adjusted under 35 U.S.C. 154(b) by 495 days.

(21) Appl. No.: 11/037,091

(22) Filed: Jan. 19, 2005

(65) Prior Publication Data

US 2005/0158197 A1 Jul. 21, 2005

(30) Foreign Application Priority Data

Jan. 19, 2004 (KR) ...................... 10-2004-0003640

(51) Int. Cl.
*B60H 1/32* (2006.01)

(52) U.S. Cl. .......................................... 62/199; 62/244

(58) Field of Classification Search ........... 62/199–200, 62/244
See application file for complete search history.

(56) References Cited

U.S. PATENT DOCUMENTS

| 4,873,837 | A | * | 10/1989 | Murray | 62/199 |
| 5,678,418 | A | * | 10/1997 | Ueno et al. | 62/200 |
| 6,804,973 | B2 | * | 10/2004 | Sugiura | 62/244 |

* cited by examiner

*Primary Examiner*—William E Tapolcai
(74) *Attorney, Agent, or Firm*—Lowe Hauptman Ham & Berner LLP

(57) ABSTRACT

The present invention relates to a refrigerating cycle of a dual-type air conditioning system for vehicles having a front and rear evaporators provided at the front and rear sides of the car, in which the installation space for a refrigerant discharging pipe installed in the refrigerant discharging sides respectively of the front and rear evaporators can be minimized, and also the arrangement of the refrigerant discharging pipe is improved to prevent the refrigerant from back-flowing, thereby enabling a smooth operation of the compressor and also improving the performance of the air conditioning system.

8 Claims, 7 Drawing Sheets

DUAL-TYPE AIR-TYPE AIR CONDITIONING SYSTEM FOR VEHICLES

RELATED APPLICATION

The present application is based on, and claims priority from, KR Application Number 2004-0003640, filed Jan. 19, 2004, the disclosure of which is hereby incorporated by reference herein in its entirety.

BACKGROUND OF THE INVENTION

1. Field of the Invention

The present invention relates to a dual-type air conditioning system for vehicles having a front and rear evaporator provided at the front and rear sides of the vehicle. More specifically, the invention relates to a dual-type air conditioning system for vehicles, in which the installation space for a refrigerant discharging pipe installed in the refrigerant discharging sides respectively of the front and rear evaporators can be minimized, and wherein the arrangement of the refrigerant discharging pipe is improved to prevent the refrigerant from back-flowing, thereby facilitating smooth operation of the compressor and improving the performance of the air conditioning system.

2. Background of the Related Art

In the air conditioning system for a vehicle, generally, the compressor driven by the engine power compresses the refrigerant and sends the compressed refrigerant to the condenser. In the condenser, the refrigerant is condensed by a forced blowing of a cooling fan. Then, the refrigerant passes, in sequence, a receiver drier, an expansion valve and an evaporator, and is returned to the compressor. During this course of circulation, the air, which is blown by a blower unit installed in the inlet end of the air conditioning case, is heat-exchanged with the refrigerant passing through the evaporator. The heat-exchanged cooled air is discharged into the occupant compartment of the vehicle to thereby cool the inside room of the car. On the other hand, while the engine coolant is returned to the engine via a heater core, the air blown by a blower unit is heat-exchanged with the coolant passing through the heater core. Then, the heated air is discharged into the occupant compartment of the vehicle to thereby heat the inside room of the car.

In the air conditioning system having the above-described construction, a small car having a small interior space employs a single-type air conditioning system, which is provided with a single evaporator installed in the engine room, i.e., at the front side of the car. In case of luxurious cars or leisure vehicles, a dual-type air conditioning system is applied in order to extend an air conditioning effect up to the rear side of the interior room of the vehicle. The dual-type system comprises a front-seat air conditioning system having an evaporator installed in the engine room and a rear-seat air conditioning system having an evaporator provided at the rear side of the car.

In the dual-type air conditioning system having the front-seat and rear-seat air conditioning systems, the front and rear evaporators can be operated simultaneously or separately. The front and rear evaporators form a refrigerating cycle where the refrigerant is circulated through a single compressor and a single condenser.

FIG. 1 is a drawing of a typical dual-type air conditioning system for a car.

As shown in FIG. 1, a conventional dual-type air conditioning system for a car comprises a compressor 300 for suctioning and compressing the refrigerant and circulating it to the condenser 400. A first and second refrigerant guide pipes 500a and 500b are provided for supplying the heat-exchanged refrigerant in the condenser 400 to a front and rear evaporators (not shown), which are installed respectively in a front seat air conditioning system 100 and a rear seat air conditioning system (not shown). A first refrigerant discharging pipe 600a is provided for connecting the refrigerant discharging side with the refrigerant suction side such that the refrigerant is supplied towards the compressor 300 from the front evaporator and is circulated with oil. In addition, a second refrigerant discharging pipe 600b for connecting the refrigerant discharging side of the rear evaporator and the refrigerant suction side of the compressor 300 is provided such that the refrigerant is supplied towards the compressor 300 from the rear evaporator.

As described above, in the conventional dual-type air conditioning system for a vehicle, when the front and rear evaporators are operated simultaneously, a low-temperature and low-pressure refrigerant discharged from the front and rear evaporators is returned to the compressor. At this time, the compressor is smoothly operated due to the oil mixed in the refrigerant.

When only the front evaporator is operated, however, the refrigerant remains stagnant in the second refrigerant discharging pipe 600b installed in the refrigerant discharging side of the rear evaporator during the course of refrigerant circulation. That is, it occurs when the high-temperature and high-pressure refrigerant discharged from the compressor 300 is returned to the compressor 300 as a low-temperature and low-pressure refrigerant through the front evaporator via the condenser 400. Therefore, a problem occurs in the operation of the compressor owing to the lack of oil in-flown to the compressor 300.

In other words, according to the above conventional refrigerating cycle of a dual-type air conditioning system for a vehicle, a refrigerant joining point S, where the first refrigerant discharging pipe 660a installed in the refrigerant discharging side of the front evaporator is joined with the second refrigerant discharging pipe 600b installed in the refrigerant discharging side of the rear evaporator, is located near the front evaporator. In addition, the second refrigerant discharging pipe 600b is disposed below the refrigerant joining point S. Therefore, a part of the low-temperature and low-pressure refrigerant, which flows into the refrigerant joining point S through the first refrigerant discharging pipe 600a, naturally flows into the second refrigerant discharging pipe 600a, and consequently a certain amount of refrigerant stays inside the second refrigerant discharging pipe 600a. Here, as the operation of the front evaporator continues, the low-temperature and low-pressure refrigerant remains stagnant in the second refrigerant discharging pipe 600b to the level above a certain amount, and the amount of oil mixed in the low-temperature and low pressure refrigerant is increased to the level more than a certain amount. Accordingly, the amount of the oil flowing into the compressor 300 is decreased, and thus the compressor can not be normally operated and also the heat-exchanging performance is deteriorated.

As an attempt in order to solve the above problems, Japanese Laid-open Patent No. 2002-67669 discloses an air conditioning system, in which the compressor can carry out a normal operation when the front evaporator is operated and at the same time the rear evaporator is not operated.

FIG. 2 is a schematic diagram for the refrigerant discharging-pipe in another conventional refrigerating cycle of a dual-type air conditioning system for a vehicle. FIG. 3 shows the conventional refrigerating cycle of FIG. 2, which is installed in a car. Similar to the conventional refrigerating cycle as described above in conjunction with FIG. 1, the conventional refrigerating cycle shown in FIGS. 2 and 3 comprises a compressor 1300 for suctioning and compressing a refrigerant and flowing it to a condenser 1400, a first and second refrigerant guide pipes 1500a and 1500b for supplying the heat-exchanged refrigerant in the condenser 1400 to a front and rear evaporators 1100 and 2100, a first refrigerant discharging pipe 1600a for discharging the refrigerant towards the compressor 1300 from the front evaporator 1500a, and a second refrigerant discharging pipe 1600b for discharging the refrigerant towards the compressor 1300 from the rear evaporator 2100.

The first and second refrigerant guide pipes 1500a and 1500b are branched towards the front and rear evaporators 1100 and 2100. The second refrigerant discharging pipe 1600b is connected at a desired position of the first refrigerant discharging pipe 1600a such that the refrigerant discharged from the first refrigerant discharging pipe 1600a is joined with the refrigerant discharged from the second refrigerant discharging pipe 1600b.

The second refrigerant discharging pipe 1600b is formed in such a manner that it is protruded upwards from a joining portion J, which is a refrigerant joining point with the first refrigerant discharging pipe 1600a. The second refrigerant discharging pipe 1600b is provided with a first bent portion 1600b-1 180°-bent from the joining portion J, and a descending portion 1600b-2 connected with the first bent portion 1600b-1 and also connected to the refrigerant discharging side of the rear evaporator 2100.

In addition, the first bent portion 1600b-1 is provided with a first bent slant portion 1600b-3 slant-formed in such a way that the joining portion J side is lowered. Also, the first bent portion 1600b-1 is provided with a second bent slant portion 1600b-4 slant-formed in such a way that the descending portion 1600b-2 is lowered.

Furthermore, the second refrigerant discharging pipe 1600b is provided at its lower side with a second bent portion 1600b-5 formed by 360°-bending such that the oil flowing towards the descending portion 1600b-2 is not flown towards the rear evaporator 2100 through the second refrigerant discharging pipe 1600b, even in case where the oil flows towards the descending portion 1600b-2. The height of the first bent portion 1600b-1 of the second refrigerant discharging pipe 1600b, which is connected to the first refrigerant discharging pipe 1600a, is set to be within a range of at least 100~120 mm.

As described above, the conventional refrigerating cycle of a dual-type air conditioning system for a vehicle is provided with the first bent portion 1600b-1 of the second refrigerant discharging pipe 1600b, which is protruded upwards from the joining portion J of a refrigerant joining point, and the second bent portion 1600b-5 bent more than 360°. Due to the first and second bent portions 1600b-1 and 1600b-5, the refrigerant is prevented from back-flowing towards the rear evaporator 2100 through the second refrigerant discharging pipe 1600b.

However, the above-described conventional refrigerating cycle of a dual-type air conditioning system for a vehicle is structured similarly to the refrigerant cycle shown in FIG. 1. That is, the joining portion J, which is a refrigerant joining point, is placed near the front evaporator 1100. The first and second refrigerant discharging pipes 1600a and 1600b are connected through the joining portion J, and simultaneously the first bent portion 1600b-1 is erectly installed. In order for the refrigerant to be prevented from back-flowing towards the second refrigerant discharging pipe 1600b, therefore, when the first and second refrigerant discharging pipes 1600a and 1600b are installed, they must comply with the complicated arrangement criteria such as the height and the bending angle of each pipe. In consequence, the installation thereof is restricted due to the limited installation space of the engine room.

SUMMARY OF THE INVENTION

Therefore, the present invention has been made in view of the above problems occurring in the prior art, and it is an object of the present invention to provide a new and improved dual-type air conditioning system for vehicles having a front and rear evaporators provided at the front and rear sides of the car, in which the installation space for a refrigerant discharging pipe installed in the refrigerant discharging sides respectively of the front and rear evaporators can be minimized, and the arrangement of the refrigerant discharging pipe is improved to prevent the refrigerant from back-flowing, thereby enabling a smooth operation of the compressor and also improving the performance of the air conditioning system.

Another object of the invention is to provide a new and improved dual-type air conditioning system for vehicles, which system can prevent an over-heating phenomenon due to waste heat generated in the vehicle engine room, and prevent instability of the refrigerating cycle which results from the over-heating.

To accomplish the above objects, according to the present invention, there is provided a dual-type air conditioning system for vehicles a compressor for sucking and compressing a refrigerant and circulating the refrigerant to a condenser, first and second refrigerant guide pipes for supplying heat-exchanged refrigerant in the condenser to front and rear evaporators, a refrigerant branching point, the first and second refrigerant guide pipes being branched from the branching point towards respectively the front and rear evaporators, a throttle for reducing the pressure of the heat-exchanged refrigerant and expanding the heat-exchanged refrigerant, a first refrigerant discharging pipe for supplying the refrigerant to an intake of the compressor from the front evaporator, a second refrigerant discharging pipe for supplying the refrigerant to the intake of the compressor from the rear evaporator, and a refrigerant joining point where the first refrigerant discharging pipe and the second refrigerant discharging pipe are joined; the refrigerant joining point being positioned on a portion of the pipe which is closer to the intake of the compressor than to the front evaporator, the first and second refrigerant discharging pipes being arranged approximately in parallel; and when the distance from the condenser to the throttle is 'L' and the distance from the condenser to the refrigerant joining point B is 'l', the distance l being equal to or less than ½ L.

Preferably, the air conditioner system is such that an arcuate portion for preventing the refrigerant from back-flowing is formed near the refrigerant joining point of the second refrigerant discharging pipe.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE DRAWINGS

Reference is now made in detail to the attached drawings.

Figure 1:
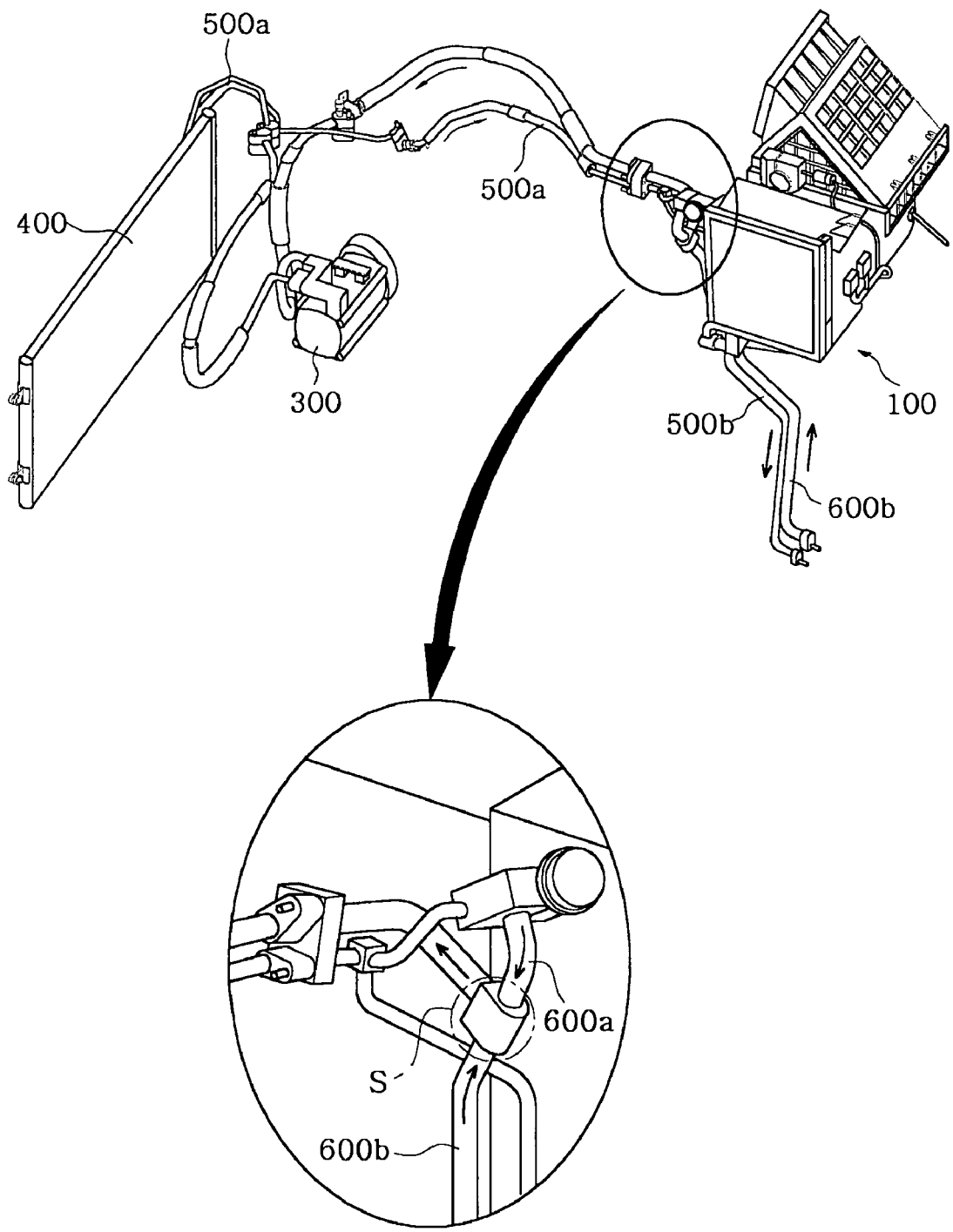
FIG. 1 is a diagram of the construction of a conventional dual-type air conditioning system for a car.
Figure 2:
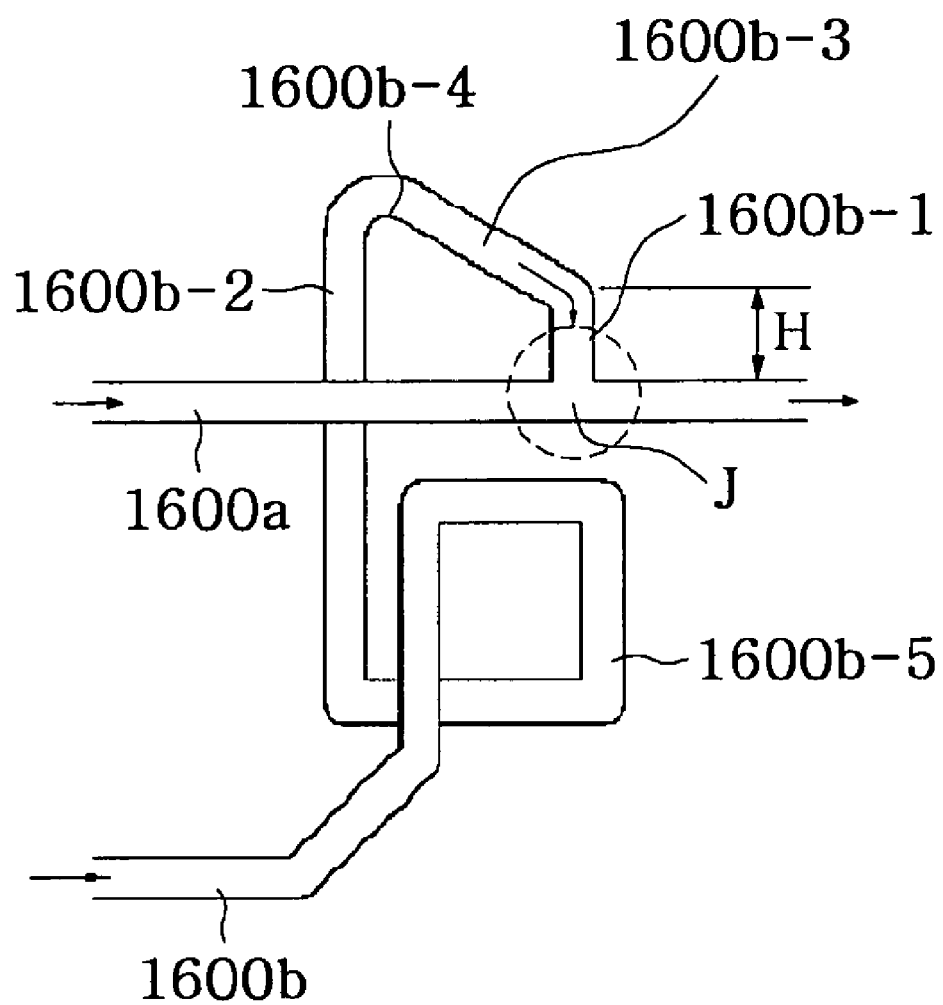
FIG. 2 is a schematic diagram for the refrigerant discharging pipe in another conventional dual-type air conditioning system for a vehicle.
Figure 3:
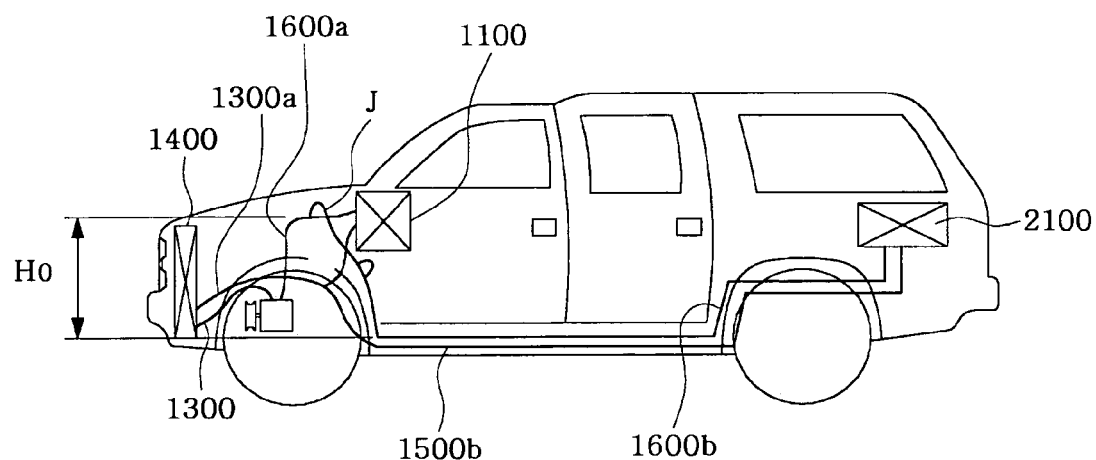
FIG. 3 is a diagram of the conventional system of FIG. 2, as installed in a car.
Figure 4:
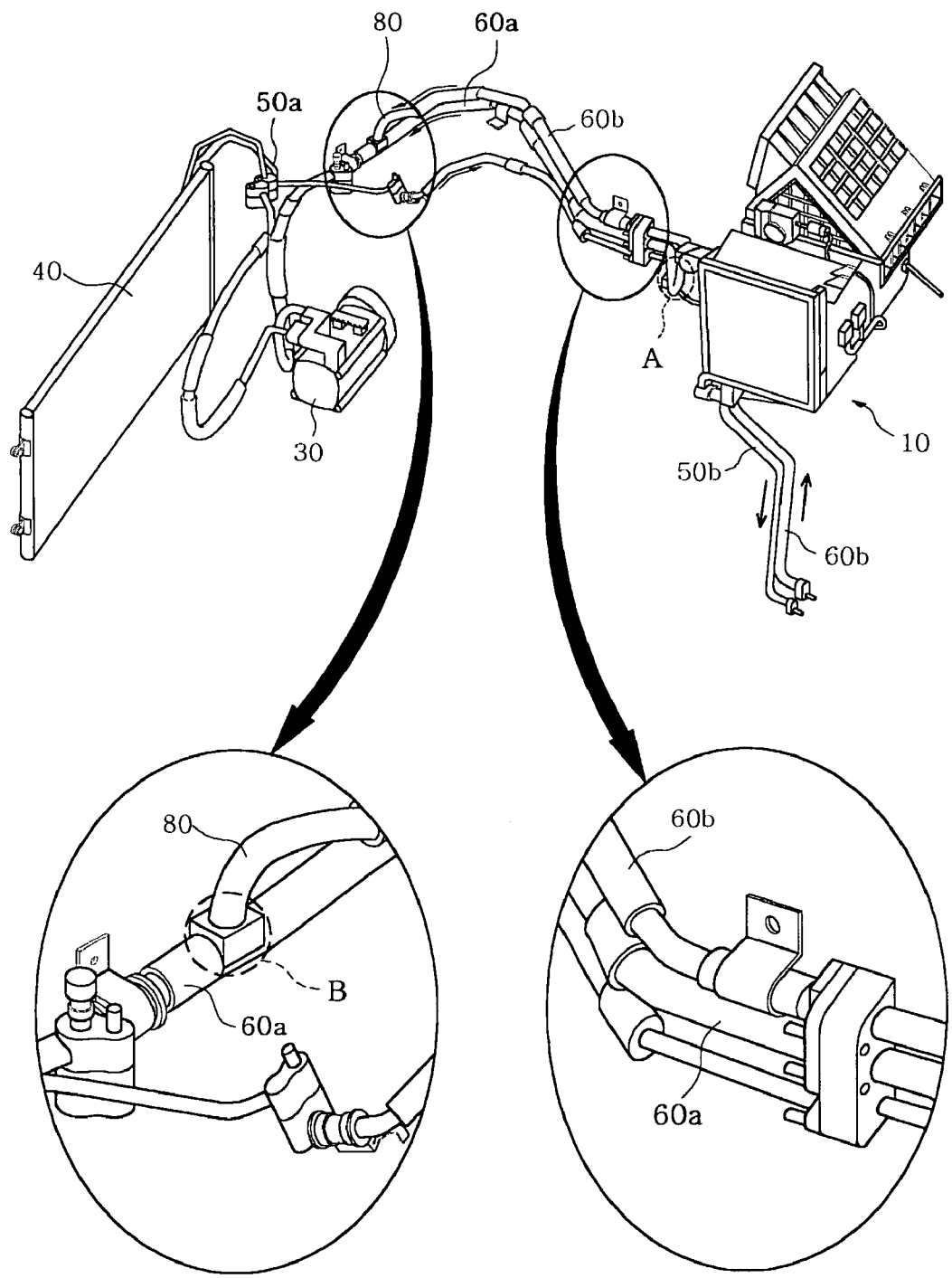
FIG. 4 is a diagram of the, construction of a dual-type air conditioning system for a vehicle according to a preferred embodiment of the invention.
Figure 5:
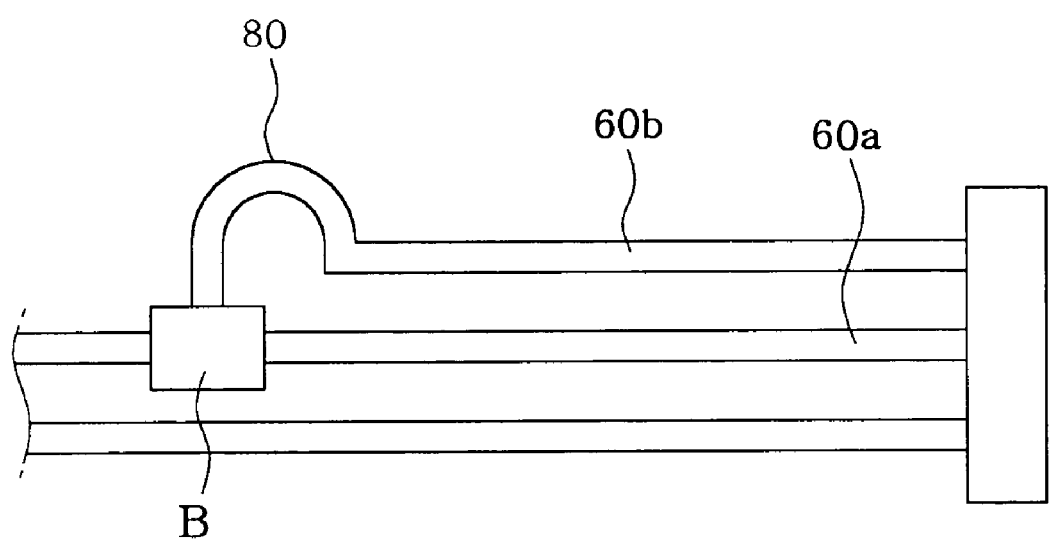
FIG. 5 is a schematic diagram of the refrigerant discharging pipe in FIG. 4.
Figure 6:
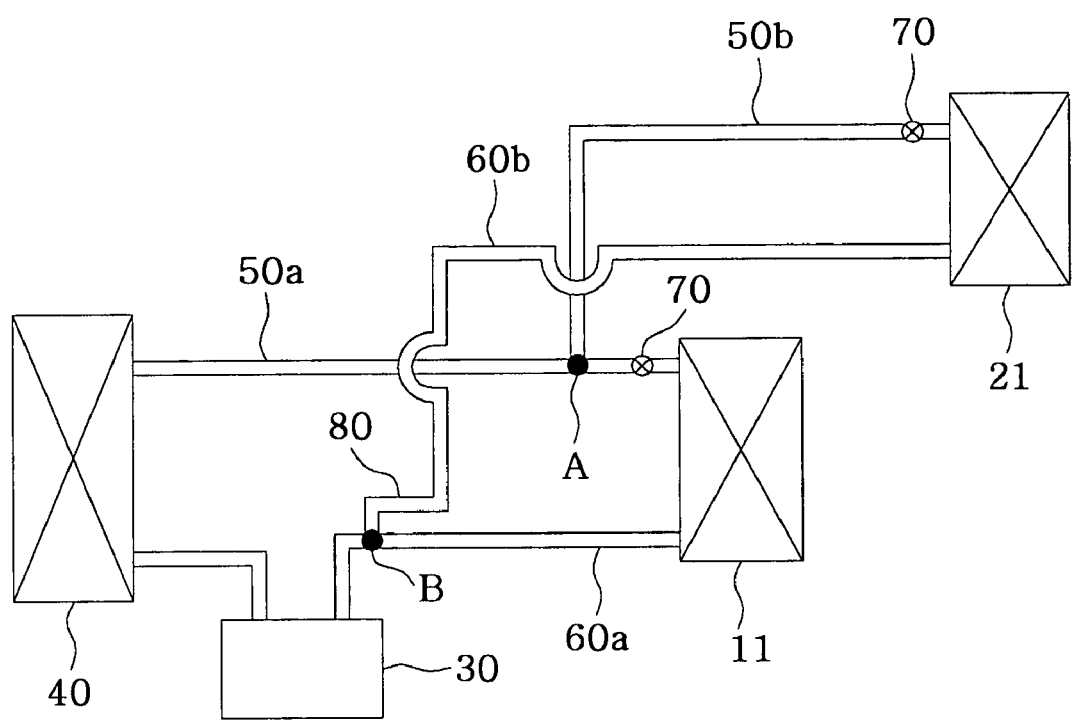
FIG. 6 is a schematic diagram of the refrigerating system according to a preferred embodiment of the invention.
Figure 7:
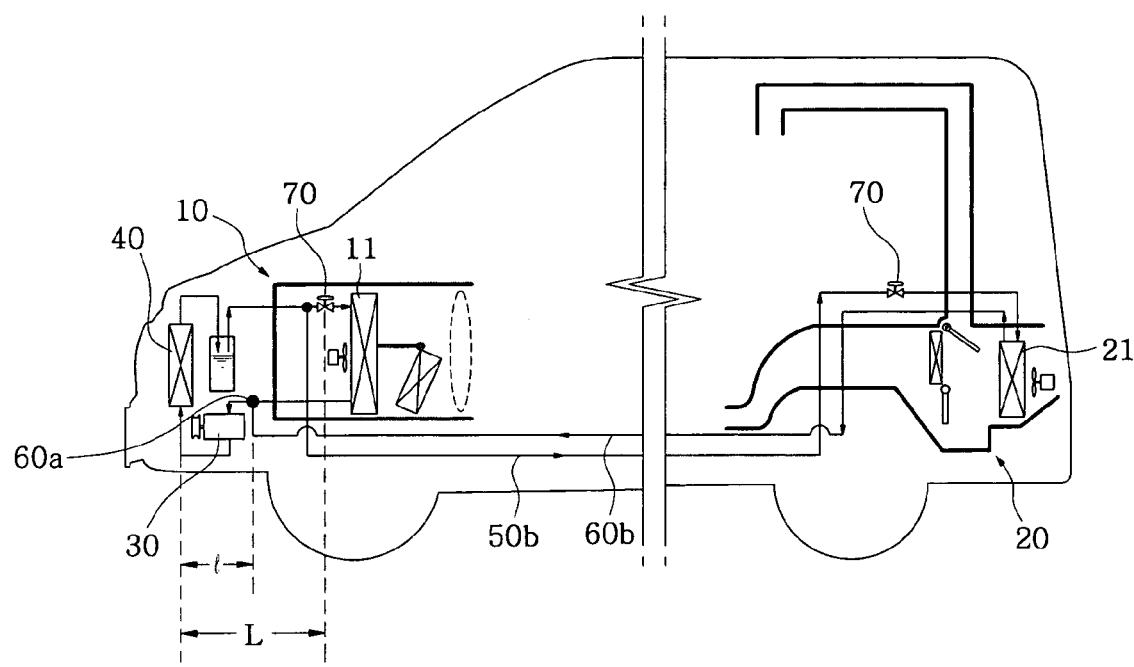
FIG. 7 is a diagram of the installed state of a dual-type air conditioning system for a vehical according to a preferred embodiment of the invention.

FIG. 4 is an illustration of the construction of a dual-type air conditioning system for a vehicle according to a preferred embodiment of the invention. FIG. 5 is a schematic diagram illustrating an arrangement of the refrigerant discharging pipe in FIG. 4. FIG. 6 is a schematic diagram of the structure of the refrigerating cycle according to a preferred embodiment of the invention. FIG. 7 is a diagram of the installed state of the dual-type air conditioning system for a vehicle according to a preferred embodiment of the invention.

The dual-type air conditioning system for a vehicle according to FIGS. 4 to 6 comprises a compressor 30 for sucking and compressing a refrigerant and circulating it to a condenser 40, a first and second refrigerant guide pipes 50a and 50b for supplying the heat-exchanged refrigerant in the condenser 40 to a front and rear evaporators 11 and 21, a refrigerant branching point A where the first and second refrigerant guide pipes 50a and 50b are branched towards the front and rear evaporators 11 and 21, a throttling means 70 for reducing the pressure of the heat-exchanged refrigerant and expanding the heat-exchanged refrigerant, a first refrigerant discharging pipe 60a for connecting the refrigerant discharging side of the front evaporator 11 with the refrigerant suction side of the compressor 30 such that the refrigerant is supplied to the compressor 30 from the front evaporator 11, a second refrigerant discharging pipe 60b for connecting the refrigerant discharging side of the rear evaporator 21 with the refrigerant suction side of the compressor 30 such that the refrigerant is supplied towards the compressor 30 from the rear evaporator 21, and a refrigerant joining point B where the refrigerants flowing the first refrigerant discharging pipe 60a and the second refrigerant discharging pipe 60b respectively are joined.

In the air conditioner having the above-described construction, as shown in FIG. 7, when the front evaporator 11 provided in the front-seat air conditioning system 10 is operated and at the same time the rear evaporator 21 provided in the rear-seat air conditioning system 20 is not operated, the low-pressure refrigerant flowing to the compressor 30 from the front evaporator 11 is prevented from back-flowing towards the second refrigerant discharging pipe 60b of the rear evaporator 21. Simultaneously, in order to solve the problem related to the installation of the first and second refrigerant discharging pipes 60a and 6b, the arrangement of the first and second refrigerant discharging pipes 60a and 6b and the position of the refrigerant joining point B are improved.

That is, the refrigerant joining point B is placed near the compressor 30, more specifically, approximately above the first refrigerant discharging pipe 60a. Near the refrigerant joining point B of the first refrigerant discharging pipe 60a is installed an arcuate portion 80, which is connected to the second refrigerant discharging pipe 6b. The first and second refrigerant discharging pipes 60a and 60b are installed in such a way as to approximately run in parallel.

According to the above-described structure, the second refrigerant discharging pipe 60b is installed in the position higher than the first refrigerant discharging pipe 60a, i.e., installed in the upper side of the refrigerant joining point B with the first refrigerant discharging pipe 60a, and at the same time it is disposed approximately in parallel with the first refrigerant discharging pipe 60a. Therefore, the oil mixed in the low-temperature and low-pressure refrigerant, which flows towards the compressor 30 from the front evaporator 11, can be normally flown, thereby enabling a normal operation of the compressor.

On the other hand, as shown in FIG. 7, if the distance from the condenser 40 to the refrigerant joining point B is '1' and the distance from the condenser 30 to the throttling means 70 is 'L', it is preferable that the distance 1 is equal to or less than ½L. That is, the air conditioning system is configured such that a relationship 1=½L is satisfied. The above distance relationship prevents instability of the refrigerating cycle, i.e., the overheating of the refrigerating cycle due to the waste heat generated in the engine room, when the refrigerant passing through the first and second refrigerant discharging pipes 60a and 60b via the first and second refrigerant guide pipes 50a and 50b from the condenser 40 flows to the compressor 30.

Table 1 shows the result of a performance test for the refrigerating cycle having the above-described construction.

TABLE 1

| Time | Sample | Room Average temp. (° C.) |
| --- | --- | --- |
| First hour | # 1 | 33.3 |
|  | # 2 | 32.7 (0.6° C. improved) |
| Second hour | # 1 | 22.0 |
|  | # 2 | 21.0 (1.0° C. improved) |
| IDLE | # 1 | 28.6 |
|  | # 2 | 28.3 (0.3° C. improved) |

(# 1: Prior Art, # 2: Present Invention)

Referring to Table 1, when the air conditioning system is operated with the front evaporator 11 being operated and with the rear evaporator 21 not being operated, the performance of the air conditioning system is tested at certain time intervals. As the result of the performance test, it has been found out that the performance of the air conditioning system according to the invention is improved, as compared with the prior art. For example, at the first hour, as the result of measuring the temperature of the vehicle occupant compartment where the air conditioning system is initially operated, it has been found that it was 32.7° C. in the present invention, as compared with 33.3° C. in the prior art, i.e., about 0.6° C. is improved. Furthermore, at the second hour, some time after the first hour, when the temperature of the vehicle occupant compartment is measured, it was found out that it was 21.0° C. in the present invention, as compared with 22.0° C. in the prior art, i.e., up to about 1.0° C. is improved as time passes. In the table 1, the term "IDLE" indicates the state where its operation is temporarily stopped while running. In this case, also the present invention showed an improved cooling performance of 0.3° C., as compared with the prior art.

As described above, the refrigerant joining point, where the first refrigerant discharging pipe installed in the refrigerant discharging side of the front evaporator is joined with the second refrigerant discharging pipe installed in the refrigerant discharging side of the rear evaporator, is disposed approximately above the first refrigerant discharging pipe, which is near the compressor. Also, the first and second refrigerant discharging pipes are arranged approximately in parallel. Therefore, during the circulation of the refrigerating cycle, the low-temperature and low-pressure refrigerant flowing towards the compressor is prevented from back-flowing towards the second refrigerant discharging pipe, thereby improving the performance of the air conditioning system and simultaneously facilitating a smooth operation of the compressor. In addition, the first and second refrigerant discharging pipes can be optimally installed even in a limited space, without any significant restriction.

Furthermore, the distance from the condenser to the refrigerant joining point is set to be within two thirds of the distance from the condenser to the throttling means, thereby preventing the overheating phenomenon due to waste heat generated from the car engine room, which leads to instability of the refrigerating cycle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A dual-type air conditioning system for vehicles comprising a compressor for sucking and compressing a refrigerant and circulating the refrigerant to a condenser, first and second refrigerant guide pipes for supplying heat-exchanged refrigerant in the condenser to front and rear evaporators, a refrigerant branching point, the first and second refrigerant guide pipes being branched from the branching point towards respectively the front and rear evaporators, a throttle for reducing the pressure of the heat-exchanged refrigerant and expanding the heat-exchanged refrigerant, a first refrigerant discharging pipe for supplying the refrigerant to an intake of the compressor from the front evaporator, a second refrigerant discharging pipe for supplying the refrigerant to the intake of the compressor from the rear evaporator, and a refrigerant joining point where the first refrigerant discharging pipe and the second refrigerant discharging pipe are joined; the refrigerant joining point being positioned so the point is closer to the intake of the compressor than to the front evaporator; the second refrigerant discharging pie being at a spatial position higher than the first refrigerant discharge pipe: the first and second refrigerant discharging pipes being arranged spatially approximately parallel to each other.

2. The dual-type air conditioning system for vehicles according to claim 1, wherein the first refrigerant discharging pipe includes, near the refrigerant joining point of the first refrigerant discharging pipe, an arcuate portion for preventing the refrigerant from back-flowing, the arcuate portion being near the refrigerant joining point of the first refrigerant discharging pipe.

3. A dual-type air-conditioning system for vehicles having a front engine compartment, comprising a compressor adapted to be in the front engine compartment for sucking and compressing a refrigerant and circulating the refrigerant to a condenser adapted to be in the front engine compartment, first and second refrigerant guide pipes for supplying heat-exchanged refrigerant in the condenser to a front evaporator adapted to be in the front engine compartment, and a rear evaporator adapted to be toward the rear of the vehicle, a refrigerant branching point adapted to be in the front engine compartment, the first and second refrigerant guide pipes being branched from the branching point towards respectively the front and rear evaporators, a throttle adapted to be in the front engine compartment for reducing the pressure of the heat-exchanged refrigerant and expanding the heat-exchanged refrigerant, a first refrigerant discharging pipe adapted to be in the front engine compartment for supplying the refrigerant to an intake of the compressor from the front evaporator, a second refrigerant discharging pipe extending between the rear evaporator and the compressor for supplying the refrigerant to the intake of the compressor from the rear evaporator, and a refrigerant joining point where the first refrigerant discharging pipe and the second refrigerant discharging pipe are joined; the refrigerant joining point being positioned so the point is closer to the intake of the compressor than to the front evaporator; the second refrigerant discharging pipe being at a spatial position higher than the first refrigerant discharging pipe, and the first and second refrigerant discharging pipes being arranged approximately spatially parallel to each other.

4. The dual-type air conditioning system for vehicles according to claim 3, wherein the first refrigerant discharging pipe includes, near the refrigerant joining point of the first refrigerant discharging pipe, an arcuate portion for preventing the refrigerant from back-flowing, the arcuate portion being near the refrigerant joining point of the first refrigerant discharging pipe.

5. The system of claim 4 wherein the distance between the condenser and the branch point is no more than half the distance between the condenser and the throttle valve.

6. The system of claim 3 wherein the distance between the condenser and the branch point is no more than half the distance between the condenser and the throttle valve.

7. The system of claim 2 wherein the distance between the condenser and the branch point is no more than half the distance between the condenser and the throttle valve.

8. The system of claim 1 wherein the distance between the condenser and the branch point is no more than half the distance between the condenser and the throttle valve.

* * * * *